United States Patent Office 2,872,446
Patented Feb. 3, 1959

2,872,446

MANUFACTURE OF CYANURIC CHLORIDE

Adolf von Friedrich and Theodor König, Leverkusen-Bayerwerk, Germany, assignors to Farbenfabriken Bayer Aktiengesellschaft, Leverkusen, Germany, a corporation of Germany No Drawing. Application September 5, 1956
Serial No. 607,997

Claims priority, application Germany January 10, 1952

1 Claim. (Cl. 260—248)

The present invention relates to a method of preparing cyanuric chloride.

Cyanuric chloride has previously been prepared by polymerizing cyanogen chloride by two different methods. One of these methods comprises the polymerization of cyanogen chloride in a solvent in the presence of a catalyst at temperatures between 0 and 60° C. without the application of superatmospheric pressure. Substances capable of accelerating Friedel-Crafts reactions, such as $AlCl_3$, $FeCl_3$, $BF_3$ and hydrogen halides, are employed as catalysts in this process. The quantity of the solvent is controlled so as to ensure that the larger portion of the resulting cyanuric chloride is obtained in solid form and can be recovered from the solvent in an appropriate manner.

The carrying out of the above process on a technical scale entails considerable disadvantages. For instance, extended reaction times are required because of the necessity of applying relatively low temperatures. Due to the high dilution and in view of the quantity of the polymer obtained in the reaction, the use of a solvent requires a large reaction space. Another disadvantage associated with the said method is that not only cyanuric chloride is formed, but also substantial quantities of polymers of higher molecular weight which, for the most part, remain in the solvent together with a larger or smaller amount of cyanuric chloride. This requires a periodical purification of the solvent before reusing it in the manufacturing process. The recovery of the cyanuric chloride from the residue formed in the purification of the solvent, which consists of a mixture of different polymers of cyanogen chloride and an essential portion of cyanuric chloride, is not economic; therefore, the residue must be destroyed which involves additional expenses.

Various attempts to eliminate the difficulties associated with the above prior art method, particularly by the use of certain solvents, failed to bring about a substantial improvement. Furthermore, the cyanuric chloride produced by the above method is obtained in a moist state making the application of the products in some fields cumbersome. The drying of the readily inflammable solvents, such as benzene, dioxane, and nitroparaffins, by evaporation involves additional apparatus and expenses.

The second method of polymerizing cyanogen chloride to cyanuric chloride consists in passing gaseous cyanogen chloride at temperatures between 190 and 600° C. over charcoal mostly impregnated with metal salts increasing the efficiency of the catalyst. This process results in a dry cyanuric chloride of good purity. The efficiency of the catalyst, however, is exhausted after a relatively short period since the polymerization taking place over charcoals results, apart from the formation of cyanuric chloride, in the coating of the surface with substances which cannot be removed because of their poor volatility. The catalyst thus becomes ineffective and must be replaced already after some working hours.

The object of the present invention is to overcome the difficulties inherent in the aforedescribed prior art methods and to provide a novel method of preparing cyanuric chloride by polymerization of cyanogen chloride. Other objects will become apparent as the following description proceeds.

The present invention is based on the discovery that cyanuric chloride may be prepared in good yield and in a state of high purity by polymerizing cyanogen chloride at elevated pressures. Pressures within the range of 20 and 100 atmospheres have proved to be especially favourable for practicing the invention, however, higher and lower pressures may also successfully be applied. The optimum reaction temperature lies within the range between 300 and 700° C., but polymerization proceeds at a satisfactory rate already at lower temperatures, for example at temperatures above 150° C.

The process of the invention may be carried out in the presence of the customarily employed catalysts, such for example as $AlCl_3$, $FeCl_3$, $SbCl_3$, $BF_3$, hydrogen halides and charcoal. These catalysts may be employed as such, in mixture with one another or supported by carriers. However, the application of superatmospheric pressure in accordance with the invention allows to accomplish the reaction without addition of any catalyst.

By maintaining appropirate reaction periods it is possible to accomplish a practically 100 percent conversion of the cyanogen chloride in a single pass. The rate of reaction grows with increasing pressures and temperatures. The method of the invention allows to obtain cyanuric chloride in yields up to 97 percent based on the cyanogen chloride used.

One mode of effecting our process on a large scale comprises heating the reaction vessel to the desired temperature prior to the beginning of the polymerization and maintaining the temperature during the exothermic reaction either by heating or cooling. The pressure in the reaction vessel is preferably produced, wholly or in part, by means of gaseous cyanogen chloride. The polymer formed can be removed from the reaction vessel in the form of a melt. No difficulties are, therefore, met in carrying out our process continuously by feeding cyanogen chloride into the reactor at a constant rate while at the same time a corresponding amount of the reaction mixture is withdrawn from the reactor.

When the process is performed in the presence of catalysts the latter may be placed in the reaction vessel either before or during the reaction. Catalysts commonly used in Friedel-Crafts reactions, such as $AlCl_3$, $FeCl_3$, $BF_3$ and hydrogen halides, do not lose their efficiency in our process, even when employed for extended periods, and are consumed only at the rate at which they are solved by the resulting cyanuric chloride.

A special advantage arising from the method of the invention is the limited size and the simplicity of the reaction vessel, making it possible to achieve relatively high through-puts. Furthermore, the polymerization is completed in a single pass so that complicated recycling processes which involve a loss of the readily volatile cyanogen chloride are unnecessary.

This application is a continuation-in-part of our copending application Serial No. 327,910, now abandoned.

The following examples illustrate some modes of carrying out the invention.

Example 1

Hydrogen chloride is fed into a closed vessel at a temperature of 435 to 455° C. in a quantity providing a pressure of 20 atmospheres. Thereupon cyanogen chloride is run in until the pressure increases to about 100 atmospheres and this pressure is kept by fresh additions of controlled quantities of cyanogen chloride. The reaction gave rise to a polymer which, in the cold, is almost white, solid and crystalline; it melts at 143 to 145°

C. and completely dissolves in benzene. The yield of cyanuric chloride is 96.8 percent calculated on the cyanogen chloride used.

*Example 2*

By conducting the polymerization without the addition of a special catalyst within a temperature range of 325 to 350° C. and at a pressure between 25 and 80 atmospheres, cyanuric chloride melting at 143 to 146° C. after cooling and dissolving in benzene or acetone without leaving a residue is obtained.

*Example 3*

By feeding cyanogen chloride into a reaction vessel containing $BF_3$ in a quantity which provides a pressure of 30 atmospheres at a temperature of 345 to 360° C. the cyanogen chloride is rapidly polymerized to cyanuric chloride of the melting point 143 to 145° C.

*Example 4*

By polymerizing cyanogen chloride below the boiling point of cyanuric chloride within the temperature range 160 to 180° C. at a pressure of 40 to 67 atmospheres cyanuric chloride of the melting point 140 to 147° C. is obtained without the addition of a catalyst. The conversion of cyanogen chloride is 100 percent.

*Example 5*

By feeding cyanogen chloride into a reaction vessel in a quantity which provides a pressure of 40 to 60 atmospheres at a temperature of 240 to 250° C. the cyanogen chloride is rapidly polymerized to cyanuric chloride. Yield 95.3 percent.

*Example 6*

By feeding cyanogen chloride into a reaction vessel in a quantity which provides a pressure of 60 to 67 atmospheres within a temperature range of 190 to 205° C. the cyanogen chloride is rapidly polymerized. Yield 85.5 percent of pure cyanuric chloride.

We claim:

A method of preparing cyanuric chloride which comprises polymerizing cyanogen chloride in the absence of a catalyst at a pressure of 20 to 100 atmospheres within a temperature range between 150 to 700° C.

References Cited in the file of this patent

FOREIGN PATENTS

| | | |
|---|---|---|
| 912,220 | Germany | May 28, 1954 |
| 718,806 | Great Britain | Nov. 17, 1954 |

OTHER REFERENCES

Beilstein's Handbuch der Organischen Chemie (4th ed.), 1937, vol. 26, page 36, System No. 3799. (See Preparation of Cyanuric Bromide, by Eghis, Berichte der Deutschen Chemischen gesellschaft, vol. 2, page 159 (1869).)